United States Patent
Bauer et al.

(10) Patent No.: US 7,013,951 B2
(45) Date of Patent: Mar. 21, 2006

(54) FRONT PART OF A MOTOR VEHICLE HAVING A FENDER UNIT

(75) Inventors: Ralph Bauer, Weil der Stadt (DE); Garry Brown, Nuneaton (GB); Thomas Frank, Stuttgart (DE); Klaus Rathje, Hildrizhausen (DE)

(73) Assignee: DaimlerChrysler AG, Stuttgart (DE)

( * ) Notice: Subject to any disclaimer, the term of this patent is extended or adjusted under 35 U.S.C. 154(b) by 152 days.

(21) Appl. No.: 10/471,861

(22) PCT Filed: Jul. 21, 2001

(86) PCT No.: PCT/EP01/08454

§ 371 (c)(1),
(2), (4) Date: Mar. 22, 2004

(87) PCT Pub. No.: WO02/074570

PCT Pub. Date: Sep. 26, 2002

(65) Prior Publication Data

US 2004/0144522 A1    Jul. 29, 2004

(30) Foreign Application Priority Data

Mar. 15, 2001   (DE) .............................. 101 12 424

(51) Int. Cl.
F28F 27/00     (2006.01)

(52) U.S. Cl. ............................ 165/41; 165/98; 165/44; 180/68.4; 180/68.6

(58) Field of Classification Search .................. 165/41, 165/51, 99, 98, 44; 180/68.1–68.6
See application file for complete search history.

(56) References Cited

U.S. PATENT DOCUMENTS

| | | | | | |
|---|---|---|---|---|---|
| 2,358,663 | A | * | 9/1944 | Scott-Iversen | 180/68.2 |
| 3,789,944 | A | * | 2/1974 | Barenyi | 180/68.6 |
| 3,884,516 | A | * | 5/1975 | Gallion et al. | 293/120 |
| 3,933,136 | A | * | 1/1976 | Burst | 123/41.58 |
| 4,566,407 | A | * | 1/1986 | Peter | 123/41.48 |
| 4,938,303 | A | * | 7/1990 | Schaal et al. | 180/68.1 |
| 4,995,447 | A | * | 2/1991 | Weidmann et al. | 165/44 |
| 5,080,411 | A | * | 1/1992 | Stewart et al. | 293/122 |
| 5,141,068 | A | * | 8/1992 | Mendicino | 180/68.3 |
| 5,205,484 | A | * | 4/1993 | Susa et al. | 236/35.3 |
| 5,513,893 | A | * | 5/1996 | Nakata et al. | 296/180.1 |

(Continued)

FOREIGN PATENT DOCUMENTS

| | | |
|---|---|---|
| DE | 3003568 | 8/1981 |
| DE | 3825071 | 10/1989 |

(Continued)

Primary Examiner—Terrell McKinnon
(74) Attorney, Agent, or Firm—Crowell & Moring LLP

(57) ABSTRACT

The invention relates to a front part of a motor vehicle having a fender unit which comprises a front fender which is covered on the outside by a fender covering, and which is connected in its lower region to a bottom supporting structure of the motor vehicle, an air guiding part being arranged underneath the fender.

According to the invention, in the event of a head-on impact the air guiding part interacts with the fender covering and stiffens it in a region which is positioned in front of the fender, the air guiding part being supported on the bottom supporting structure.

33 Claims, 5 Drawing Sheets

U.S. PATENT DOCUMENTS

| | | | |
|---|---|---|---|
| 5,813,491 A * | 9/1998 | Sato et al. | 180/309 |
| 5,915,490 A * | 6/1999 | Wurfel | 180/68.1 |
| 5,918,663 A * | 7/1999 | Hoglinger et al. | 165/41 |
| 6,405,819 B1 * | 6/2002 | Ohkura et al. | 180/68.1 |
| 6,467,538 B1 * | 10/2002 | Acre et al. | 165/266 |
| 6,513,843 B1 * | 2/2003 | Frederick et al. | 293/36 |

FOREIGN PATENT DOCUMENTS

| | | | | |
|---|---|---|---|---|
| EP | 535406 | * | 4/1993 | 180/68.1 |
| GB | 2131150 | * | 6/1984 | 180/68.4 |
| GB | 2343740 | | 5/2000 | |
| JP | 58-47624 | * | 3/1983 | 180/68.1 |
| JP | 2002-274430 | * | 9/2002 | 180/68.4 |

* cited by examiner

FRONT PART OF A MOTOR VEHICLE HAVING A FENDER UNIT

BACKGROUND AND SUMMARY OF THE INVENTION

This application claims the priority of International application No. PCT/EP01/08454 filed Jul. 21, 2001, and German Patent Document No. 101 12 424.4 filed Mar. 15, 2001, the disclosures of which are expressly incorporated by reference herein.

The invention relates to a front part of a motor vehicle having a fender unit.

German Patent Document No. DE 38 25 071 C1 has already disclosed a front part of a motor vehicle with a fender unit which is connected to a bottom supporting structure of the motor vehicle and in which cooling air openings are made in a fender covering in order to supply cooling air to the drive assemblies arranged behind the fender unit. The cooling air openings are arranged above and below a transverse carrier which is associated with the fender unit and into which a fender which is elastic with respect to impacts is integrated.

In order to pass on the air flowing through the cooling air openings to the drive assemblies with as few flow losses as possible, an air guiding part, which forms an air guiding duct, is arranged between the fender covering and the bottom supporting structure.

With such or similar additional assemblies for improving the efficiency of the drive assemblies in the front region of a motor vehicle, the packing density is increased more and more so that there is less structural free space for the configuration of measures to improve pedestrian protection in the event of collisions.

The invention is therefore based on the object of developing a front part of a motor vehicle of the generic type to the effect that, while maintaining the advantageous effect of the air guiding part, protection of pedestrians in the event of a collision is improved.

By reinforcing the fender covering with a component which is already present, such as the air guiding part, the structural space which is available in the front of the motor vehicle for improving the impact protection for pedestrians is utilized to an optimum degree. Here, the air guiding part has a reinforcing effect on the fender covering in a region positioned in front of the fender so that in the event of a collision a pedestrian firstly enters into contact with this region which runs approximately at the level of the pedestrian's lower legs. The movement impetus which acts in the lower leg region away from the front part of the motor vehicle causes the pedestrian to be slung around about the center of gravity of his body so that his upper body moves in the direction of the engine hood. In the process, the fender which is of resilient construction is pressed in so that the pedestrian rolls across the engine hood in a defined fashion. At the same time, the reinforcement of the fender covering acts as an under-ride protection for pedestrians so that they cannot be pulled under the motor vehicle in the event of a collision. The air guiding part is set here in such a way that the necessary supporting force is reached quickly and maintained while the acceleration values and the necessary penetration paths for the pedestrian are preserved.

As the air guiding part extends over virtually the entire width of a motor vehicle, the fender covering is also reinforced in the lateral regions of the front part of the motor vehicle, and at the same time the cross-sectional surface which is available in the front area of the motor vehicle is used to an optimum degree for feeding cooling air.

In one preferred embodiment, the air guiding part is supported at the front end by two longitudinal carrier sections which are associated with the bottom supporting structure. The air guiding part is embodied as an injection-molded part, and the plastic used should be relatively rigid, impact-resistant and not too brittle. The connection to the front ends of the longitudinal carrier sections permits stable support on already existing components which can be integrated into the injection-molded part without much additional expenditure on change.

A rear end collision protection element which is fitted over the front ends of the longitudinal carrier sections acts, in addition to its function as a support of the air guiding part, as a rear end collision protection in the event of minor damage. For example, when the rear end of the motor vehicle strikes against curves or the like, the longitudinal carrier sections which are associated with the supporting structure can be protected to an optimum degree against damage by the rear end collision protection element. The rear end collision protection element is preferably manufactured from plastic so that adaptation to virtually any shape of the connection between the supporting structure and the air guiding part can be brought about.

In order to reduce the manufacturing costs further, the air guiding part can be constructed as one piece with the rear end collision protection element.

As a result of the air guiding part extending laterally beyond the supporting points on the front ends of the longitudinal carrier sections, the pedestrian protection is also provided even when there is an offset collision with a pedestrian.

In order to support the air guiding part uniformly on the fender covering, the contour of the air guiding part which faces the fender covering is adapted to the internal contour of the fender covering. In addition, the fender covering can be prestressed by the air guiding part in order to improve the dimensional stability of the fender covering.

In one particularly preferred embodiment, the air guiding part has a wing-like shape. In order to make the air guiding part inherently stable, a number of reinforcement ribs which are oriented in the longitudinal direction of the motor vehicle and which are spaced apart from one another in the transverse direction of the motor vehicle are arranged on the upper side of the wing.

Reinforcement ribs which extend from the underside of the wing in the direction of the fender covering act in a particularly reinforcing fashion in the lower region of the fender covering. The matching of the terminating edge of each reinforcement rib to the internal contour of the fender covering particularly increases the degree of rigidity in this region so that in the event of a crash the lower limb of a pedestrian can bounce off.

The formation of an at least partially closed hollow section by the covering, the fender, and the air guiding part provides further reinforcement in order to protect pedestrians against impacts with simple means. Here, the wing can be attached by its terminating edges to the fender covering, or else only bear against it.

In addition to supporting the air guiding part on both sides on the front ends of the longitudinal carrier sections it is possible to provide support on a transverse carrier which connects the front longitudinal carrier sections. This further improves the degree of rigidity of the fender covering in the lower region.

BRIEF DESCRIPTION OF THE DRAWINGS

Further advantageous refinements of the invention are explained below with reference to the drawings, in which.

DETAILED DESCRIPTION OF THE DRAWINGS

Figure 1:
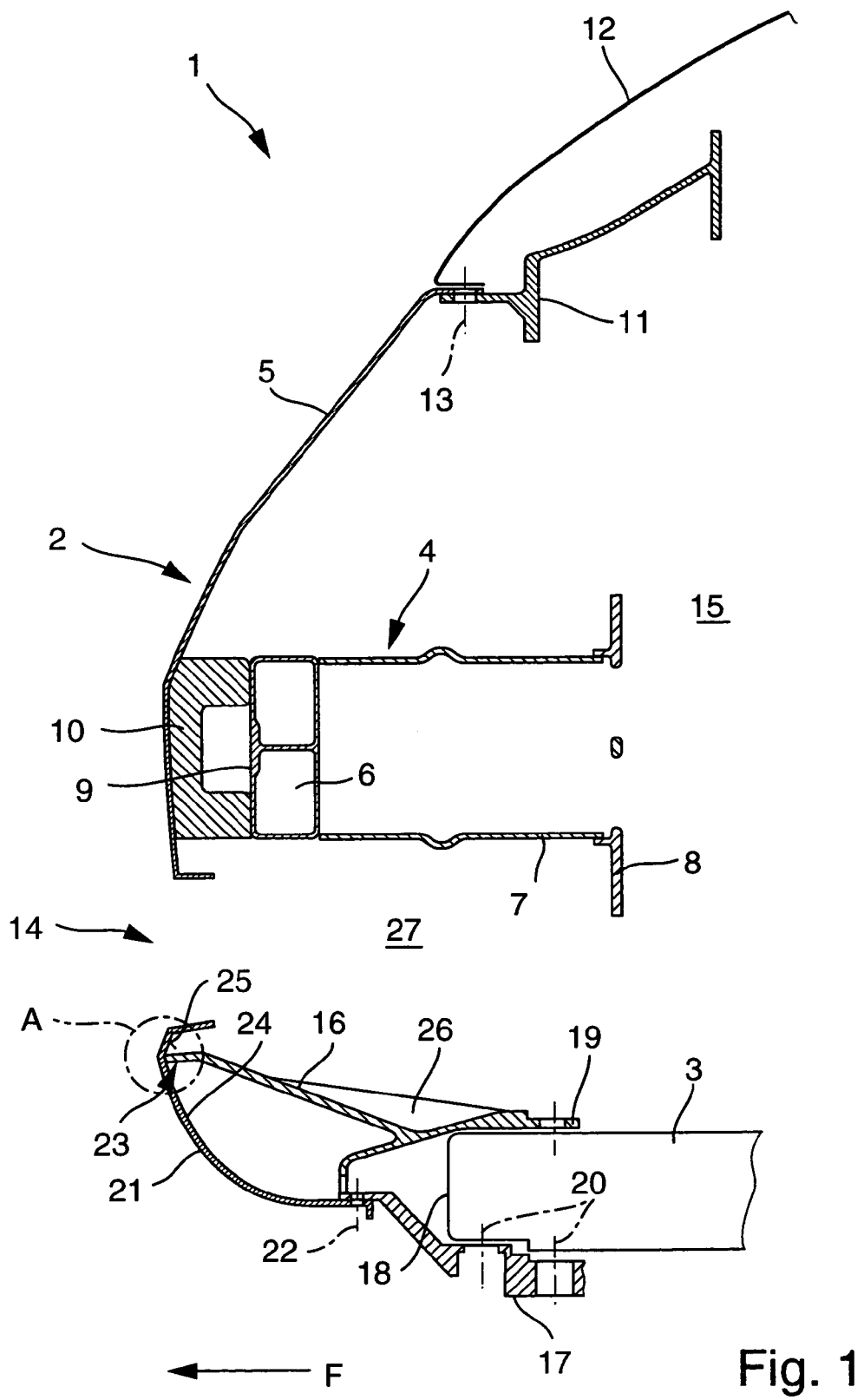
FIG. 1 shows a longitudinal sectional view at the level of a right-hand longitudinal carrier of a front part of a motor vehicle as taken along line I—I in FIG. 3.

FIG. 1 illustrates a front part 1 of a motor vehicle having a fender unit 2 in a longitudinal section which runs at the level of a front longitudinal carrier section 3, the longitudinal carrier section 3 being associated with a bottom supporting structure (not illustrated in more detail) of a motor vehicle.

The fender unit 2 comprises a front fender 4 and a fender covering 5.

The front fender 4 is formed by a transverse carrier 6 which is connected to a supporting component 8 of the motor vehicle by an impact absorber 7. An impact foamed part 10, which extends over virtually the entire width of the motor vehicle, is attached to the front end side 9 of the transverse carrier 6 which is embodied as a two-chamber hollow section. The impact foamed part 10 has a U-shaped cross section.

The front part 1 of the motor vehicle is terminated at the front by the fender covering 5 which is connected in the upper region to a motor vehicle bodywork frame part 11 and a side part 12 by a screwed connection 13. A cooling air opening 14 which extends at least partially over the width of the motor vehicle is made in the fender covering 5 below the front fender 4 in order to supply sufficient cooling air to the drive assemblies arranged in the engine cavity 15. In this exemplary embodiment, the cooling air opening 14 is configured to supply cooling air to a charge air cooler which is, however, not illustrated in FIG. 1.

An air guiding part 16 which is attached by a rear end collision protection element 17 to the front end 18 of the longitudinal carrier section 3 is arranged underneath the cooling air opening 14. For this purpose, the rear end collision protection element 17 is constructed as a single plastic component together with the air guiding part 16, the rear end collision protection element 17 being attached in its rear region 19 to the longitudinal carrier section 3 by a screwed connection 20. The rear end collision protection element 17 is shaped in such a way that its internal contour is essentially matched to the external contour of the front end 18 of the longitudinal carrier section so that the rear end collision protection element 17 can easily be fitted over the front end 18. At the same time, the lower lip 21, extending underneath the cooling air opening 14, of the fender covering 5 is attached by a screwed connection 22 to the rear end collision protection element 17 and thus to the front longitudinal carrier section 3.

The air guiding part 16 extends in a wing shape over virtually the entire width of the motor vehicle, irrespective of whether or not a cooling air opening 14 is arranged above. With its terminating edge 23 which faces the fender covering 5, the air guiding part 16 which extends in a tongue shape in the longitudinal direction of the motor vehicle bears against the inner contour 24 of the fender covering 5, the inner contour 24 being formed in the abutment area of the terminating edge 23 as an engagement angle 25 in order to support the air guiding part 16 in a way which is low in vibration. In order to reinforce the air guiding part 16, reinforcement ribs 26 which are oriented in the longitudinal direction of the motor vehicle are arranged on the upper side of the air guiding part 16. Depending on the desired degree of rigidity, the number of reinforcement ribs 26 can be increased in the transverse direction of the motor vehicle, the distances between the reinforcement ribs 26 being correspondingly reduced.

Covering the lower lip 21 with the air guiding part 16 results in an air guiding duct 27 which is closed at least in the downward direction and through which the air which flows in is directed to the charge air cooler in a selected fashion. The tongue-shaped configuration of the air guiding part makes it possible to ensure that the air which has flowed in is used to an optimum degree without undesired flow losses occurring. At the same time, adaptation to the structural conditions in the front area of the vehicle occurs, the air stream which enters through the cooling air opening 14 being capable of being oriented in a selected fashion with respect to the drive assembly which is to be cooled.

When there is a pedestrian collision, the air guiding part 16 acts in a reinforcing fashion on the lower lip 21 which is associated with the fender covering 5 and is positioned slightly in front of the fender 4. The lower lip 21 is correspondingly the component in the front part 1 of the motor vehicle which protrudes furthest forward. The consequence of this is that when there is a collision with a pedestrian, firstly its lower limb is sensed by the lower lip 21 by the region A marked with a circle in FIG. 1. The reinforcement of the lower lip 21 with the air guiding part 16 in precisely this region A moves the pedestrian's legs away from the motor vehicle in the direction of travel F so that the pedestrian is deflected about the center of gravity. When there is an impact against the impact foamed part 10, impact forces are absorbed by the pressing in of the impact foam while the pedestrian rolls over the engine hood in a defined fashion. This virtually rules out the possibility of the pedestrian with which there has been a collision being run over. For this purpose, the engine hood can be equipped with further measures for protecting pedestrians, for example, an airbag in the region of the upper edge of the engine hood. In further embodiments, the lower lip 21 can be embodied so as to be flush with the contour of the fender covering or positioned slightly behind it.

Figure 2:
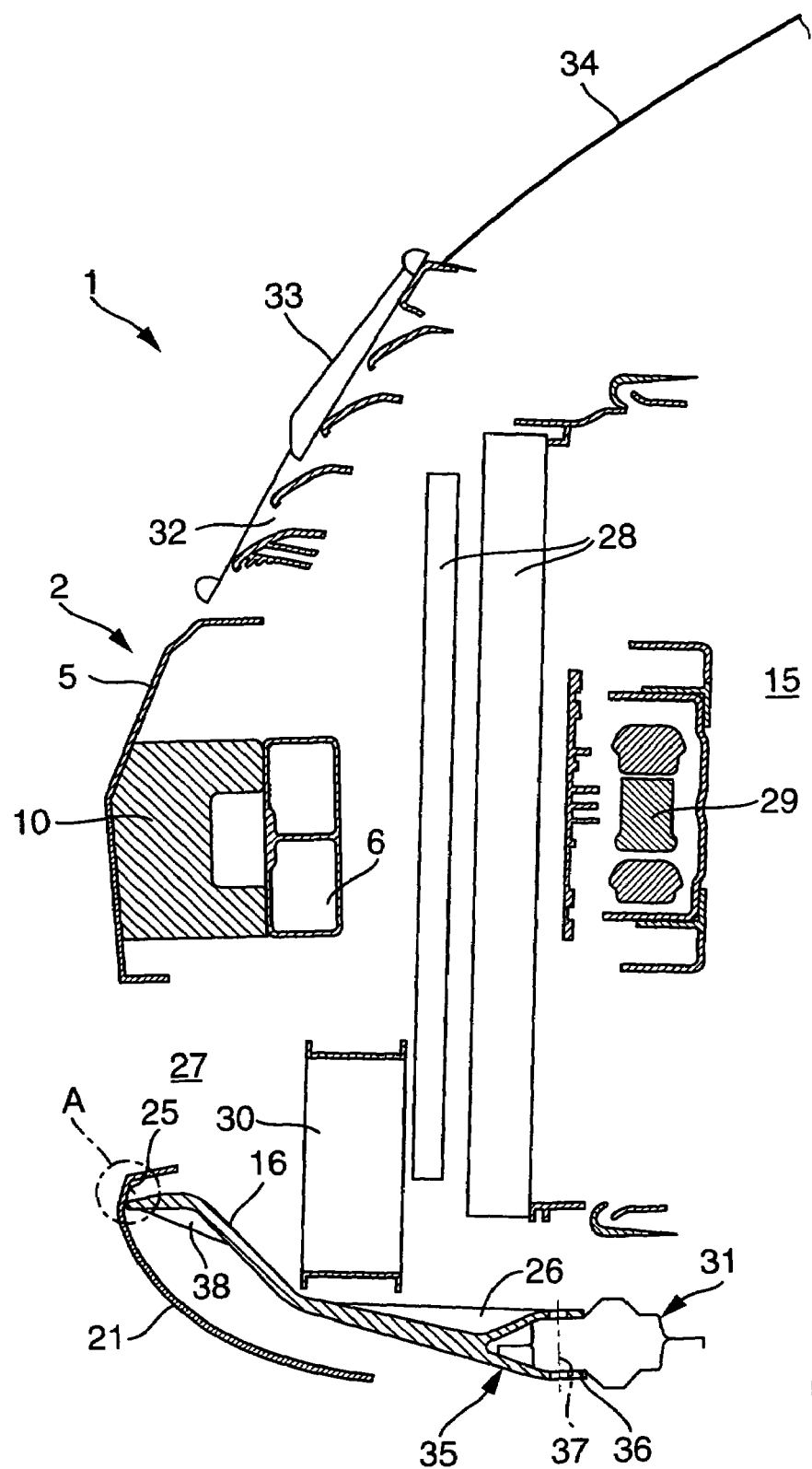
FIG. 2 shows a longitudinal sectional view at the level of the motor vehicle center of the front part of a motor vehicle as taken alone line II—II in FIG. 3.

FIG. 2 illustrates a longitudinal section through the center of the front part 1 of the motor vehicle, identical reference symbols characterizing identical components.

The assemblies which are to be cooled are also apparent from FIG. 2, 28 designating a radiator, 29 designating a fan and 30 designating the charge air cooler which has already been mentioned in FIG. 1. In contrast to FIG. 1, a transverse carrier 31 of the bottom supporting structure can be seen here, the transverse carrier 31 connecting the front longitudinal carrier sections 3 (not illustrated here) to one another.

Above the transverse carrier 6 which is connected to the impact foamed part 10, a further cooling air opening 32, which is covered with a radiator grill 33, is provided in the fender covering 5. The air which flows in through the radiator grill 33 is fed to the radiator 28 located behind it. Above the radiator grill 33 there is an adjoining engine hood 34.

The air guiding part 16 is formed in the shape of a tongue in the center of the motor vehicle and thus conducts the air flowing in through the cooling air opening 14 directly to the charge air radiator 30. The tongue-shaped cross section promotes reduction in the air in the direction of the charge air cooler 30 without unnecessary leak losses arising due to eddying.

In order to provide support in the center of the motor vehicle on the bottom supporting structure, the air guiding part 16 is connected to the transverse carrier 31. For this purpose, the end 35 which faces the transverse carrier 31 is embodied in a fork shape. The end 35 which is formed as a fork 36 is partially fitted over the transverse carrier 31 and attached to it by a screwed connection 37.

The air guiding part 16 in turn extends from the fork 36 as far as the inner contour 25 of the lower lip 21 which is associated with the fender covering 5 and acts in a reinforcing fashion on the fender covering 5 when there is a collision with a pedestrian in the region A. The air guiding part 16 has, analogously to FIG. 1, reinforcement ribs 26 on its upper side. In order to improve the degree of rigidity, reinforcement ribs 38 are additionally provided on the underside of the air guiding part 16.

Figure 3:
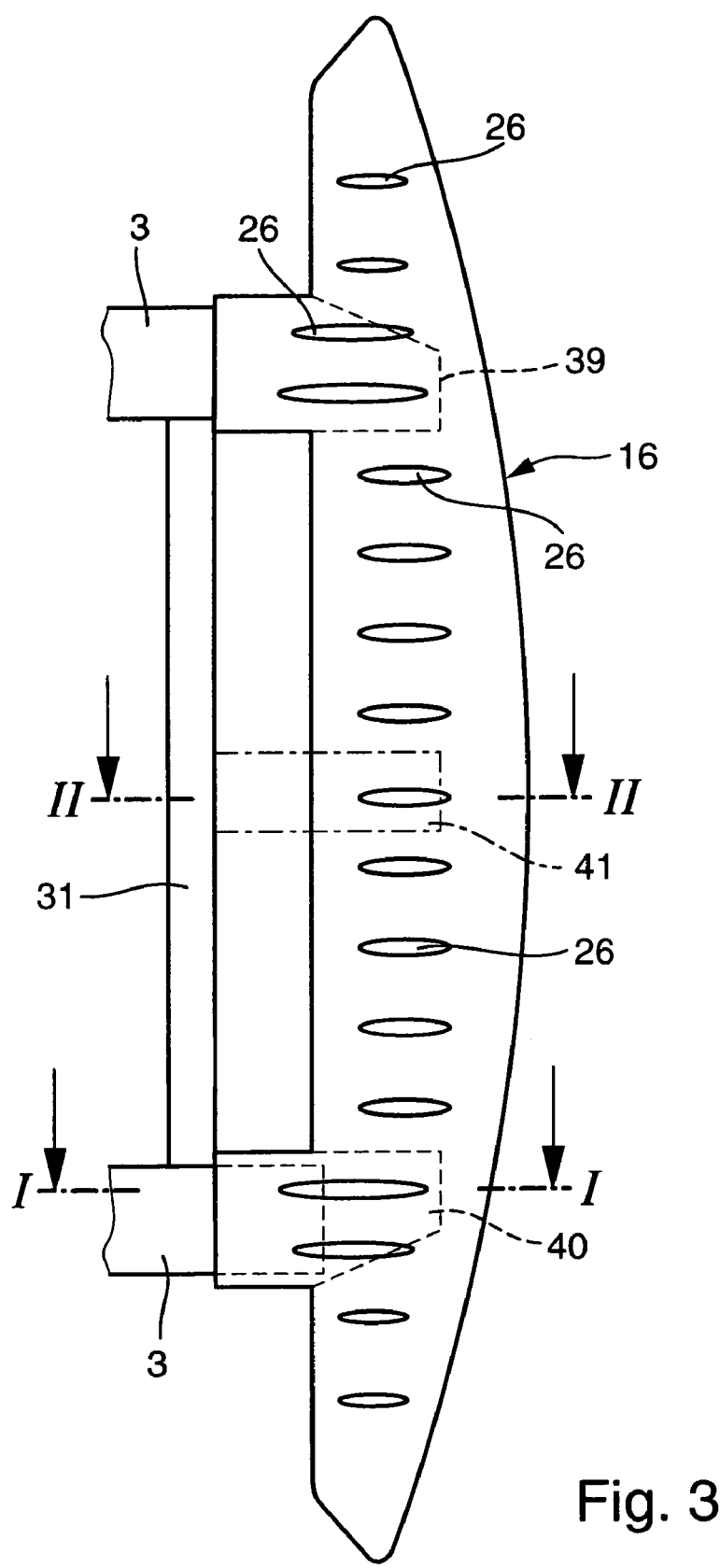
FIG. 3 shows a plan view of the air guiding part which is illustrated in FIGS. 1 and 2.

FIG. 3 illustrates a schematic plan view of the air guiding part 16 from above, the air guiding part 16 extending in a wing shape over virtually the entire width of the motor vehicle and beyond the supports 39 and 40 (described in FIG. 1) on the front longitudinal carrier section 3.

Longitudinal section illustrations which have already been described in FIGS. 1 and 2 are shown with lines I—I for FIG. 1, and II—II for FIG. 2.

As shown FIG. 3, the reinforcement ribs 26 are distributed over the entire extent of the air guiding part 16 in the transverse direction of the motor vehicle.

An additional support 41 (illustrated by dot dash lines) is optionally arranged on the transverse carrier 31 between the supports 39 and 40 provided on the longitudinal carrier sections 3, the supports having already been described by an exemplary embodiment in FIG. 3. Of course, further additional supports 41 may also be provided in order to prevent possibly occurring natural oscillations of the air guiding part 16.

Figure 4:
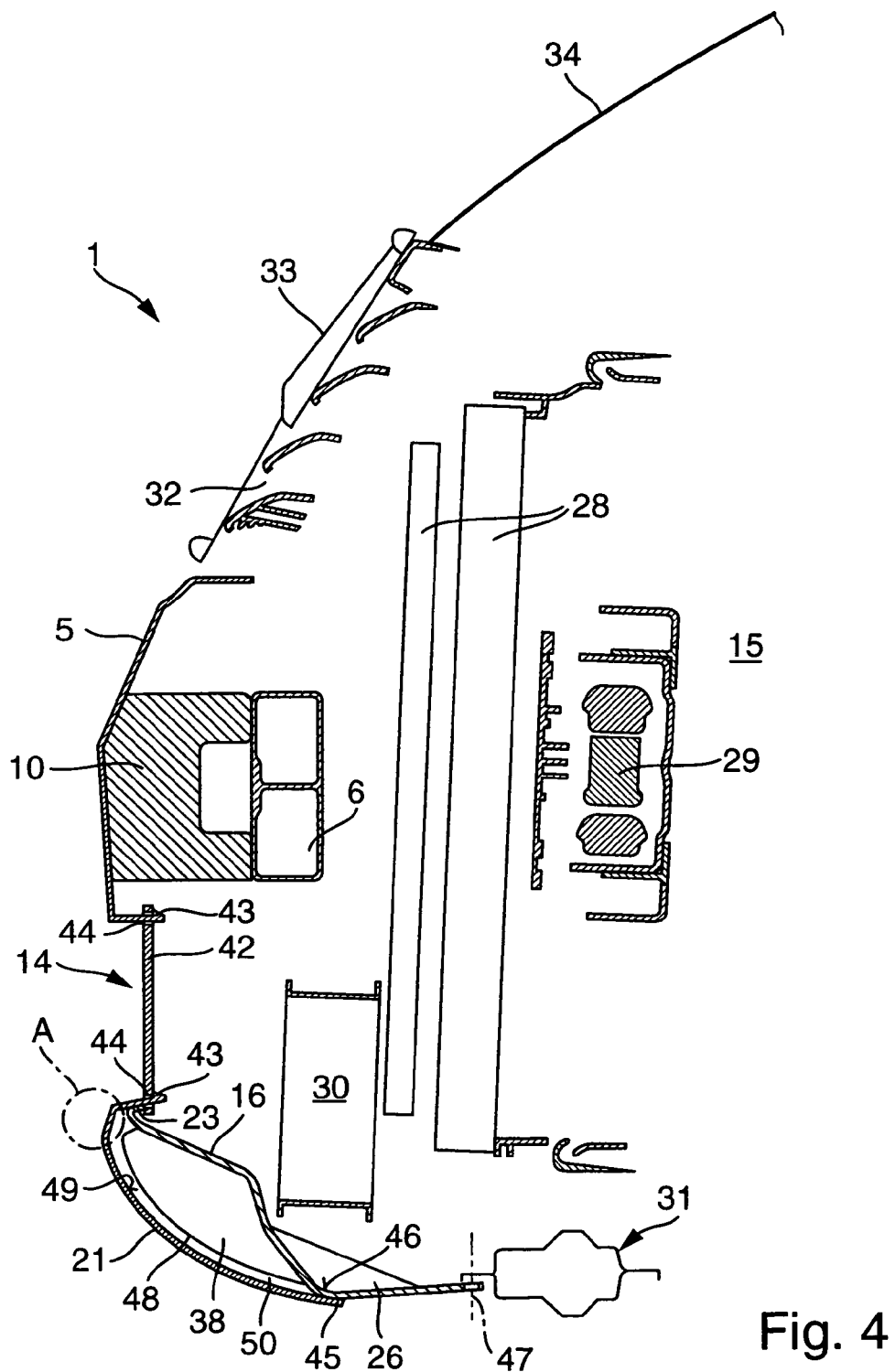
FIG. 4 shows a longitudinal sectional view at the level of the motor vehicle center of a front part of a motor vehicle in a second embodiment as taken along line II—II in FIG. 3.

A further exemplary embodiment of the support 41 on the transverse carrier 31 is illustrated in FIG. 4 along the line II—II from FIG. 3.

The front part 1 of the motor vehicle is constructed analogously to the exemplary embodiment illustrated in FIG. 2 and differs only in the form of the air guiding part 16.

The air guiding part 16 then extends from the cooling air opening 14 over the lower lip 21 as far as the transverse carrier 31 of the bottom supporting structure. In the region of the cooling air opening 14, the air guiding part 16 is embodied as a cooling air grill 42 and is attached to opening edges 44 of the cooling air opening 14 by latching projections 43. The air guiding part 16 is of step-shaped construction underneath the cooling air opening 14 in order to direct the air which flows in through the cooling air opening 14 in a selected fashion to the charge air radiator 30. In contrast to the first exemplary embodiment in FIG. 2, the terminating edge 23 is welded to the lower opening edge 44 of the cooling air opening 14. Alternatively, another means of attachment, for example clipping, may also be provided. The air guiding part 16 bears with a part region 46 against the lower termination 45 of the lower lip 21 and is also fastened there by welding or clipping.

The support 41 on the transverse carrier 31 is provided by a screwed connection 47. Alternatively, in the region of the support on the transverse carrier 31, the air guiding part 16 may be of similar construction to the fork 36 in FIG. 2.

As in the exemplary embodiment in FIG. 2, the air guiding part 16 has reinforcement ribs 26 and 38 both on its upper side and on its lower side. However, in contrast to FIG. 2, the reinforcement ribs 26 and 38 are configured with a significantly large area in order to reinforce the lower lip 21 further in the lower region of the fender covering 5. In particular, the contour 48 of the reinforcement rib 38 is approximated to the inner contour 49 of the lower lip 21 so that the cavity 50 which is formed by the lower lip 21 and the air guiding part 16 is closed virtually entirely by the reinforcement rib 38. When there is a collision with a pedestrian, there is a strong impact effect as a result of the reinforced lower lip 21 against the pedestrian's lower leg, and the pedestrian is thus pushed away from the motor vehicle with the part of his body lying below the center of gravity of his body, and is moved with the upper part of his body onto the engine hood. At the same time, this promotes the leg region of the pedestrian being moved out of the danger area of the front wheels.

Figure 5:
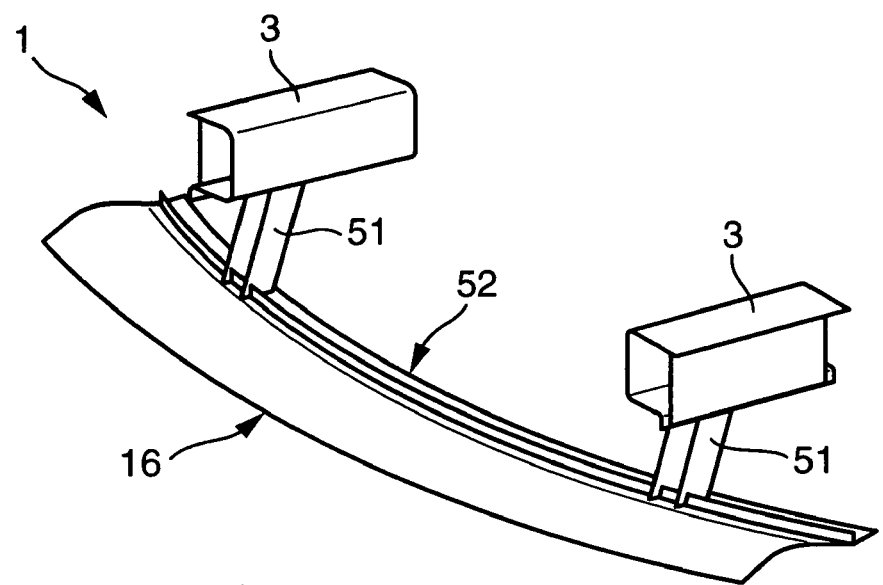
FIG. 5 shows a perspective oblique view of an air guiding part in a third embodiment.

FIG. 5 illustrates a third exemplary embodiment of an air guiding part 16 which is suitable for an elongated front part 1 of a motor vehicle whose front longitudinal carrier sections 3 are arranged above the region A which is critical for the impact with a pedestrian.

In order to support the air guiding part 16 on the longitudinal carrier sections 3 which are formed as a closed box profile, struts 51 are provided which are attached to the underside of each longitudinal carrier section 3, for example, with a welded connection. The struts 51 are oriented here, in terms of the vertical axis of the motor vehicle, with their lower end obliquely forward, the orientation of the struts 51 being however dependent on the arrangement of the fender system with respect to their position in relation to the supporting structure 3.

The lower ends of the struts 51 are connected to one another over the width of the motor vehicle by a carrier part 52 which has a higher degree of rigidity than the air guiding part 16 which is composed, for example, of plastic. The higher degree of rigidity of the carrier part may be achieved, for example, by constructing the carrier part as a closed box profile made of sheet metal. Given a corresponding configuration of the air guiding part 16, the force which acts when there is an impact with a pedestrian can be absorbed sufficiently quickly by the air guiding part 16 and passed onto the bottom supporting structure via the carrier part 52 and the struts 51. The air guiding part 16 is set here in such a way that the necessary supporting force is reached quickly and maintained while values the acceleration and necessary penetration paths for the pedestrian are preserved.

Figure 6:
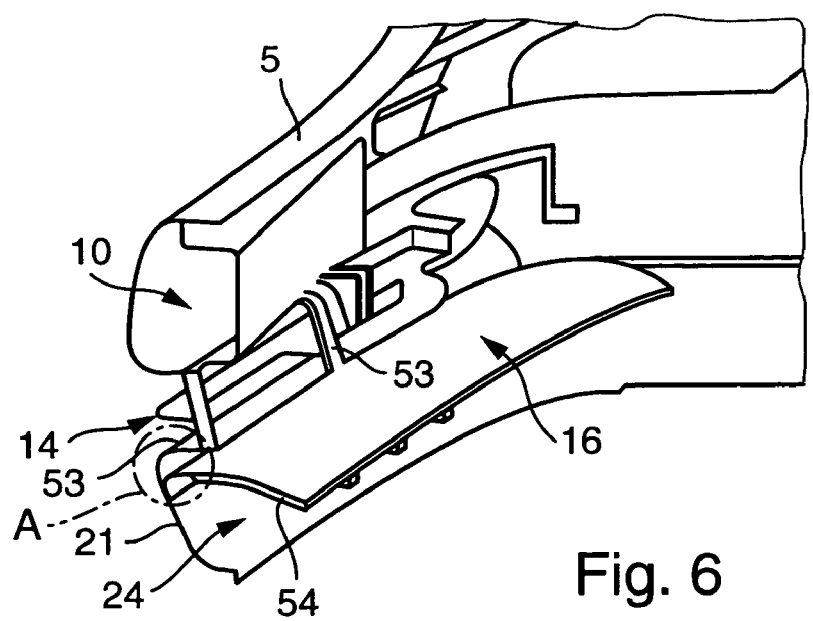
FIG. 6 shows a perspective view of the arrangement of the air guiding part according to FIG. 5 in the fender unit in a perspective oblique view from behind.

FIG. 6 shows the positioning of the air guiding part 16 with respect to the fender covering 5 and the impact foamed part 10. The cooling air opening 14 which is partially covered with webs 53 is bounded in its lower region, analogously to the exemplary embodiments described above according to FIGS. 1 to 4, by the lower lip 21 of the fender unit 2. In contrast to conventional fender units, the front termination of the impact foamed part 10 bears with the critical region A of the lower lip 21 in a virtually vertically extending transverse plane of the motor vehicle. In this way, the lower leg region of a pedestrian receives impetus over a large area counter to the direction of travel when there is an impact so that the upper body can roll in a defined fashion in the direction of the engine hood.

The formation of the air guiding part is illustrated here by way of example with reinforcement ribs 54 which are arranged on the underside of the air guiding part 16 over the width of the motor vehicle. As a result, a controlled degree of rigidity is obtained over the entire width of the motor vehicle, preventing the lower leg region penetrating or rotating too far into the lower lip 21. The air guiding part 16 can be supported on the inner contour 24 of the lower lip 21 by appropriate connecting technology such as screws, bonding, or rivets, in order to achieve effective force support.

The degree of rigidity of the air guiding part 16 can be individually matched by the following factors to the necessary force/displacement characteristic which is specific to the motor vehicle and fender:
- type of material, material thickness and material geometry;
- position, size, embodiment and wall thickness of the reinforcement ribs;
- alternative use of net-shaped or honeycomb-shaped reinforcement structures;
- the degree of rigidity of the carrier part 52 is preferably higher than that of the air guiding part 16 (alternatively, the carrier part 52 can be matched to the air guiding part 16 in such a way that joint deformation of both parts is possible);
- connecting technologies between the lower lip 21 and a guiding part 16; and
- position and design of the reinforcement ribs 54 over the width of the motor vehicle.

Irrespective of the aforesaid factor for matching the force/displacement characteristic, the air guiding part 16 is constructed in such a way that an approximately identical deformation behavior, and thus identical kinematics of the impact of the leg, can be ensured over the entire width of the motor vehicle.

The invention claimed is:

1. A front part of a motor vehicle having a bumper unit which comprises an air guiding part which is disposed under a cooling air opening defined by a fender covering and which is connected in a lower region to a bottom supporting structure of the motor vehicle and wherein a region of connection between the fender covering and the air guiding part extends beyond a portion of the fender covering that is disposed above the cooling air opening, wherein in an event of a head-on impact, the air guiding part interacts with the fender covering and stiffens the fender covering in a region which is positioned in front of a front fender.

2. The front part of a motor vehicle as claimed in claim 1, wherein the air guiding part extends over an entire width of the motor vehicle.

3. The front part of a motor vehicle as claimed in claim 1, wherein the air guiding part is supported by a front end of two longitudinal carrier sections which are associated with the bottom supporting structure.

4. The front part of a motor vehicle as claimed in claim 3, wherein a rear end collision protection element is connected to the air guiding part and is fitted over each of the front ends of the longitudinal carrier sections.

5. The front part of a motor vehicle as claimed in claim 4, wherein the air guiding part is constructed as one piece with the rear end collision protection element as a plastic part.

6. The front part of a motor vehicle as claimed in claim 3, wherein the air guiding part extends laterally beyond supports disposed on the longitudinal carrier sections.

7. The front part of a motor vehicle as claimed in claim 1, wherein a contour of the air guiding part which faces the fender covering is adapted to an internal contour of the fender covering and wherein the contour of the air guiding part bears against and is connected to the internal contour of the fender covering.

8. The front part of a motor vehicle as claimed in claim 1, wherein the air guiding part is embodied in one piece with the fender covering.

9. The front part of a motor vehicle as claimed in claim 1, wherein the air guiding part has a wing-like shape and a plurality of reinforcement ribs which are oriented in a longitudinal direction of the motor vehicle, are spaced apart from one another in a transverse direction of the motor vehicle, and are arranged on an upper side of the wing-like shape.

10. The front part of a motor vehicle as claimed in claim 9, wherein at least one of the plurality of reinforcement ribs is arranged on an underside of the wing-like shape, the contour of the at least one reinforcement rib which lies opposite the fender covering being matched to an internal contour of the fender covering.

11. The front part of a motor vehicle as claimed in claim 9, wherein the air guiding part forms a closed hollow section together with a region of the fender covering which is positioned in front of the air guiding part.

12. The front part of a motor vehicle as claimed in claim 3, wherein a support is provided on a transverse carrier and wherein the transverse carrier connects the two longitudinal carrier sections.

13. A front part of a motor vehicle, comprising:
- a fender;
- a cover disposed over the fender and defining a cooling air opening; and
- an air guiding part, wherein the air guiding part is disposed under the cooling air opening and is connected to the cover at a front end and to a bottom supporting structure of the motor vehicle at a rear end and wherein a region of connection between the cover and the air guiding part extends beyond a portion of the cover that is disposed above the cooling air opening.

14. The front part of a motor vehicle as claimed in claim 13, wherein a contour of the air guiding part matches a contour of the cover.

15. The front part of a motor vehicle as claimed in claim 13, wherein the air guiding part extends over a width of the motor vehicle.

16. The front part of a motor vehicle as claimed in claim 13, wherein the air guiding part is supported by a front end of two longitudinal carrier sections which are associated with the bottom supporting structure.

17. The front part of a motor vehicle as claimed in claim 16, wherein a rear end collision protection element is connected to the air guiding part and is fitted over each of the front ends of the longitudinal carrier sections.

18. The front part of a motor vehicle as claimed in claim 17, wherein the air guiding part is constructed as one piece with the rear end collision protection element as a plastic part.

19. The front part of a motor vehicle as claimed in claim 16, wherein the air guiding part extends laterally beyond supports disposed on the longitudinal carrier sections.

20. The front part of a motor vehicle as claimed in claim 13, wherein the air guiding part has a wing-like shape and a plurality of reinforcement ribs which are oriented in a longitudinal direction of the motor vehicle, are spaced apart from one another in a transverse direction of the motor vehicle, and are arranged on an upper side of the wing-like shape.

21. The front part of a motor vehicle as claimed in claim 20, wherein at least one of the plurality of reinforcement ribs is arranged on an underside of the wing-like shape, the contour of the at least one reinforcement rib which lies opposite the cover being matched to an internal contour of the cover.

22. The front part of a motor vehicle as claimed in claim 20, wherein the air guiding part forms a closed hollow section together with a region of the cover which is positioned in front of the air guiding part.

23. The front part of a motor vehicle as claimed in claim 16, wherein a support is provided on a transverse carrier and wherein the transverse carrier connects the two longitudinal carrier sections.

24. A front part of a motor vehicle having a bumper unit which comprises an air guiding part which is arranged underneath a fender covering and a front fender and which is connected in a lower region to a bottom supporting structure of the motor vehicle, wherein the air guiding part is supported by a front end of two longitudinal carrier sections which are associated with the bottom supporting structure, and wherein in an event of a head-on impact, the air guiding part interacts with the fender covering and stiffens the fender covering in a region which is positioned in front of the front fender.

25. The front part of a motor vehicle as claimed in claim 24, wherein a rear end collision protection element is connected to the air guiding part and is fitted over each of the front ends of the longitudinal carrier sections.

26. The front part of a motor vehicle as claimed in claim 25, wherein the air guiding part is constructed as one piece with the rear end collision protection element as a plastic part.

27. The front part of a motor vehicle as claimed in claim 24, wherein the air guiding part extends laterally beyond supports disposed on the longitudinal carrier sections.

28. The front part of a motor vehicle as claimed in claim 24, wherein a support is provided on a transverse carrier and wherein the transverse carrier connects the two longitudinal carrier sections.

29. A front part of a motor vehicle having a bumper unit which comprises an air guiding part which is arranged underneath a fender covering and a front fender and which is connected in a lower region to a bottom supporting structure of the motor vehicle, wherein the air guiding part has a wing-like shape and a plurality of reinforcement ribs which are oriented in a longitudinal direction of the motor vehicle, are spaced apart from one another in a transverse direction of the motor vehicle, and are arranged on an upper side of the wing-like shape, and wherein in an event of a head-on impact, the air guiding part interacts with the fender covering and stiffens the fender covering in a region which is positioned in front of the front fender.

30. The front part of a motor vehicle as claimed in claim 29, wherein at least one of the plurality of reinforcement ribs is arranged on an underside of the wing-like shape, the contour of the at least one reinforcement rib which lies opposite the fender covering being matched to an internal contour of the fender covering.

31. The front part of a motor vehicle as claimed in claim 29, wherein the air guiding part forms a closed hollow section together with a region of the fender covering which is positioned in front of the air guiding part.

32. A front part of a motor vehicle having a bumper unit which comprises an air guiding part which is arranged underneath a fender covering and a front fender and which is connected in a lower region to a bottom supporting structure of the motor vehicle, wherein the air guiding part is arranged underneath a cooling air opening defined by the fender covering and wherein the air guiding part extends over an entire width of the motor vehicle, and further wherein in an event of a head-on impact, the air guiding part interacts with the fender covering and stiffens the fender covering in a region which is positioned in front of the front fender.

33. A front part of a motor vehicle having a bumper unit which comprises an air guiding part which is arranged underneath a fender covering and a front fender and which is connected in a lower region to a bottom supporting structure of the motor vehicle, wherein the air guiding part is embodied in one piece with the fender covering, and wherein in an event of a head-on impact, the air guiding part interacts with the fender covering and stiffens the fender covering in a region which is positioned in front of the front fender.

\* \* \* \* \*